March 24, 1936.  J. S. LOEWUS  2,035,171
SHAFT COUPLING
Filed Dec. 17, 1932   4 Sheets-Sheet 1
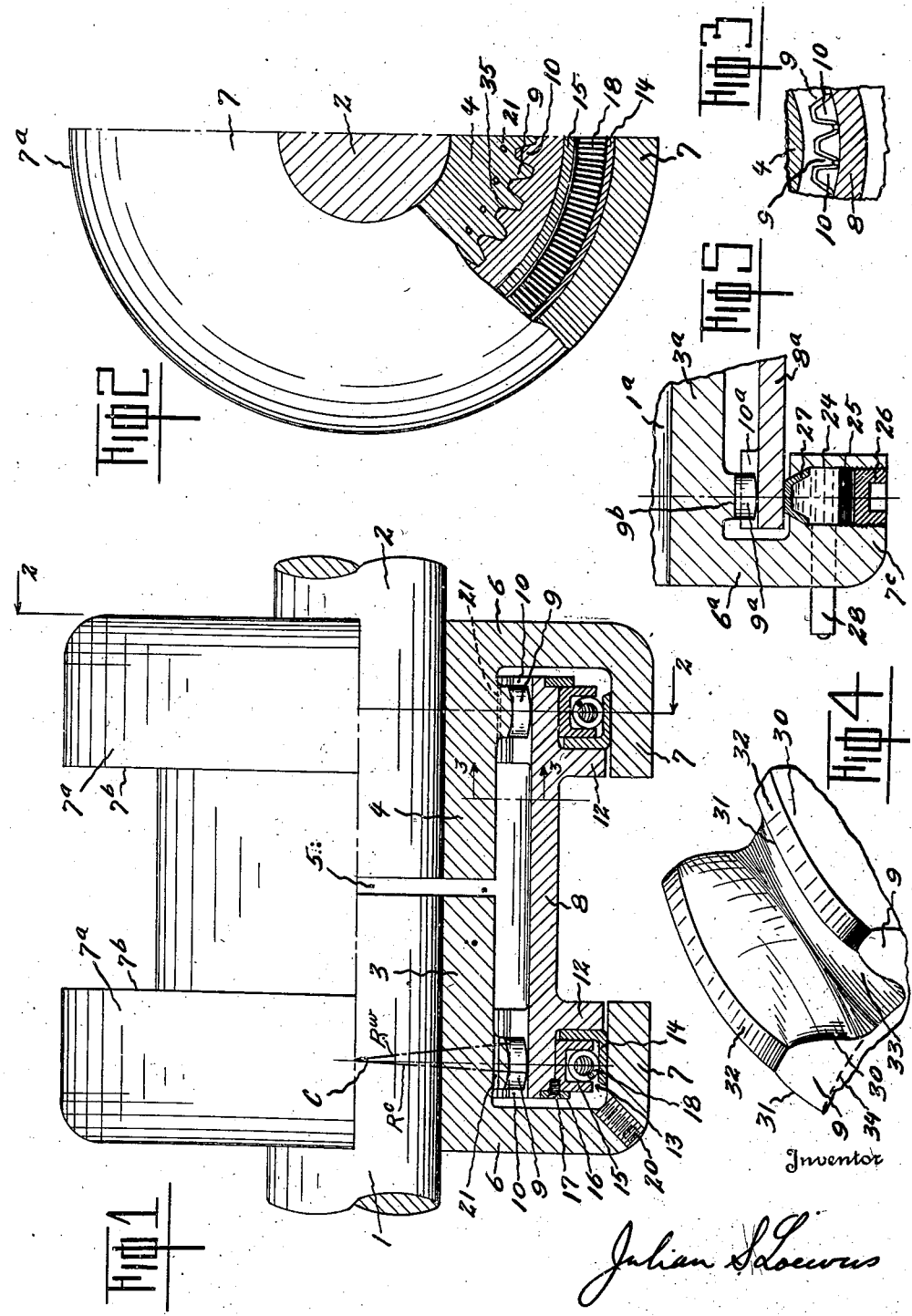
Inventor
Julian S Loewus

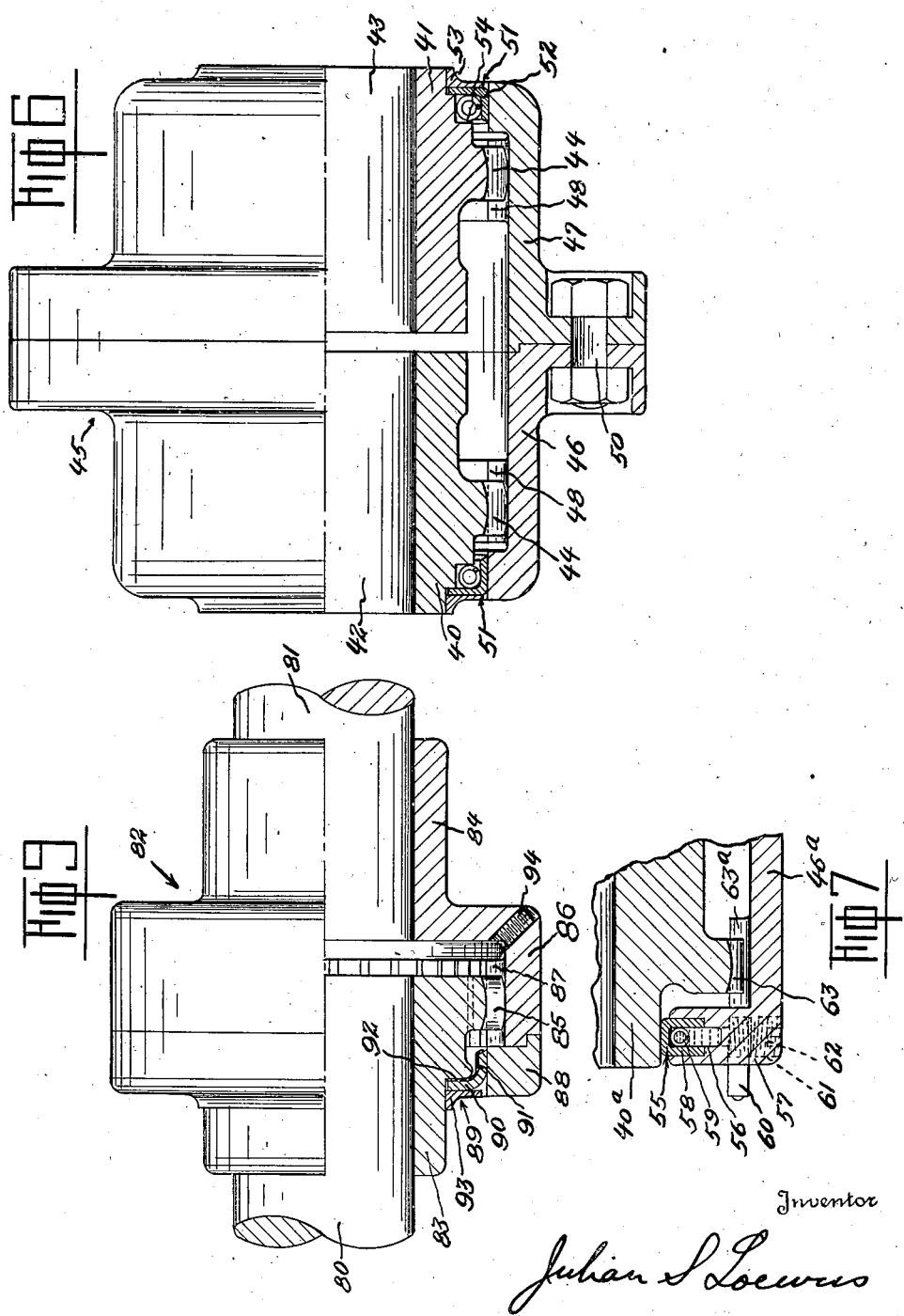

March 24, 1936. J. S. LOEWUS 2,035,171
SHAFT COUPLING
Filed Dec. 17, 1932  4 Sheets-Sheet 3
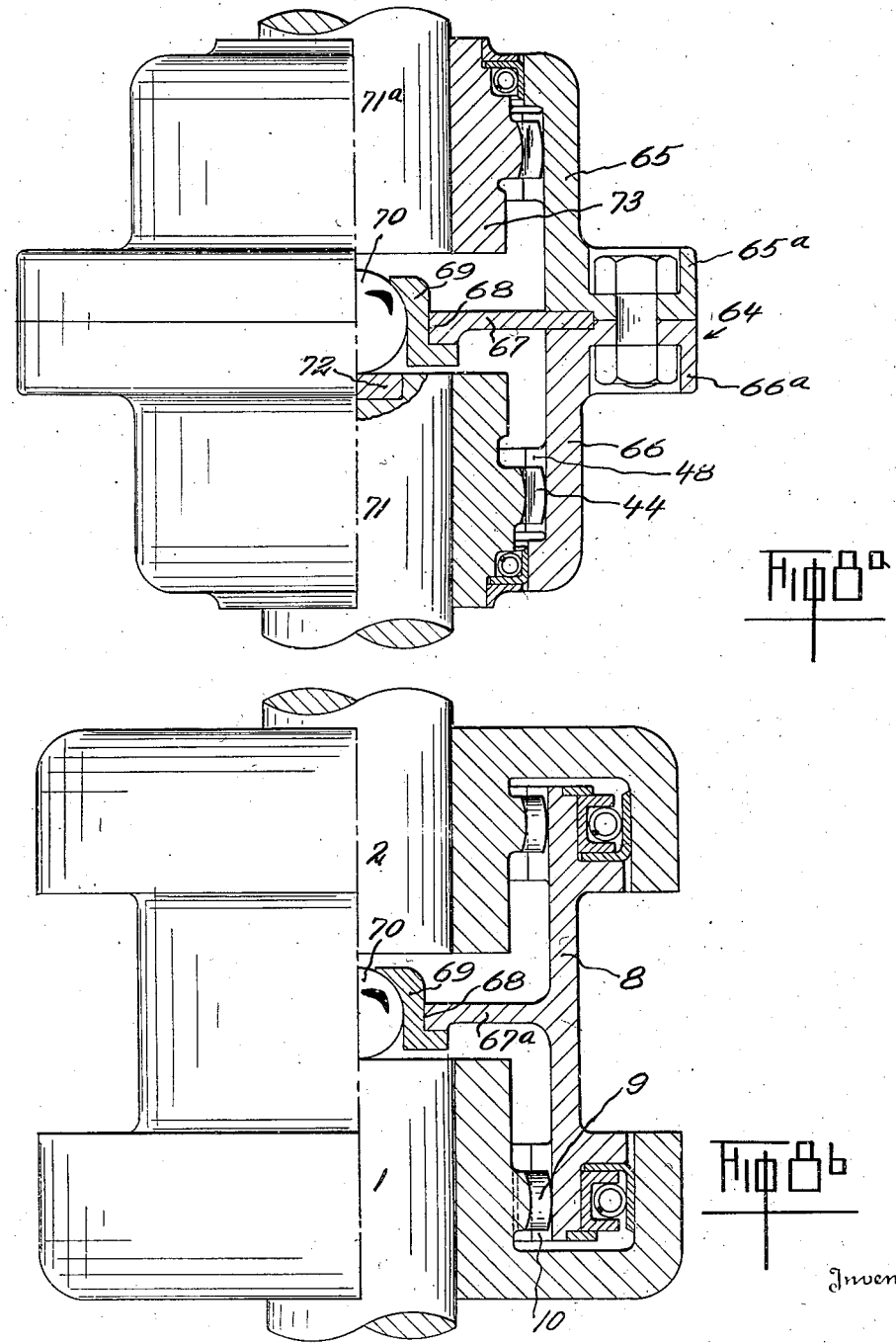
Inventor
Julian S Loewus March 24, 1936. J. S. LOEWUS 2,035,171
SHAFT COUPLING
Filed Dec. 17, 1932 4 Sheets-Sheet 4
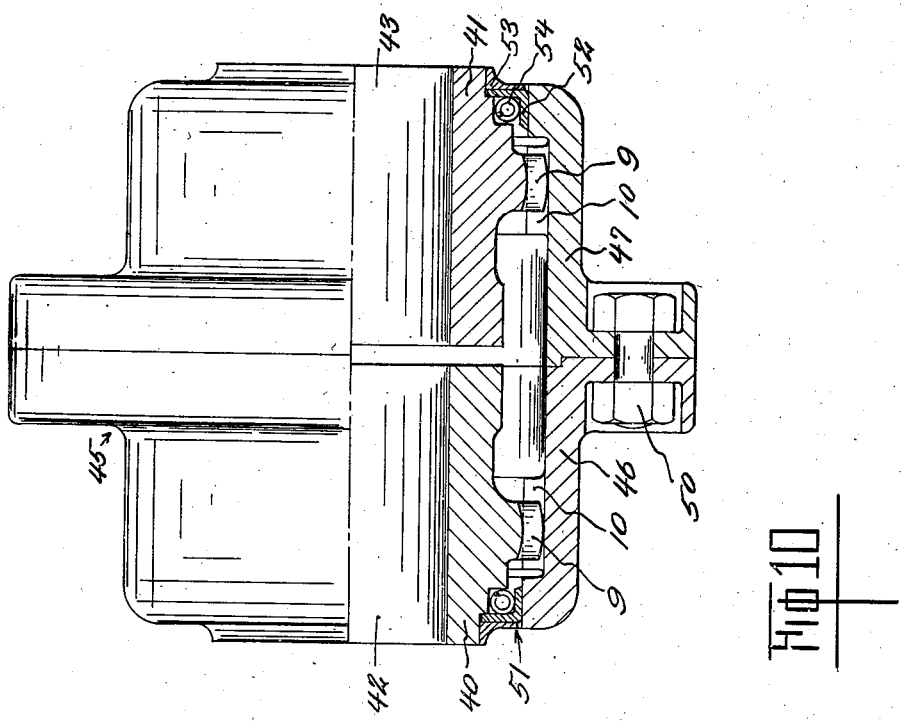
INVENTOR.
Julian S Loewus Patented Mar. 24, 1936

2,035,171

UNITED STATES PATENT OFFICE 2,035,171

SHAFT COUPLING

Julian S. Loewus, Baltimore, Md.

Application December 17, 1932, Serial No. 647,812

19 Claims. (Cl. 64—9)

This invention relates to rotary shaft couplings adapted to connect the ends of driving and driven shafts and to further compensate for misalignment of said shafts, and is a continuation in part of my application Serial Number 522,038, filed Mar. 12, 1931, which will issue on December 20, 1932, as Patent Number 1,891,285.

It is an object of this invention to so construct the teeth of the cooperating coupling elements that there is bearing and rocking contact for the transmission of torque around the entire peripheral circuit of the teeth of said coupling, by providing the teeth on at least one of said coupling elements with curved side faces, curved crowns as well as curving the space or wall between the roots of said teeth, thus obviating by this construction objectionable backlash, lowering the unit stress per tooth, permitting a greater degree of misalignment of the shafts angular as well as parallel, eliminating vibration and noise, and permitting the use of higher speeds.

Another object of this invention is to provide a positive oil seal for the coupling whereby the same may be completely filled with oil and which oil seal is adapted to accommodate itself to any degree of misalignment of the coupling elements. Various types of oil seals are herein contemplated certain of which are adapted to be acted upon by the centrifugal force set up in the body of the oil upon rotation of the coupling and others in which the seal is primarily obtained by virtue of the pressure set up in a grease packing.

An additional object of this invention is to provide a coupling adapted for use with vertically disposed shafts.

Another object of this invention contemplates the adaptation of certain of the coupling elements for use as a universal joint.

A still further object of this invention is the provision of an improved coupling which is simple in construction, inexpensive in manufacture, easily installed and of high efficiency in operation.

Further objects, and objects relating to details of construction and assembly will appear more fully hereinafter.

In the accompanying drawings,

Fig. 1 is a view of the coupling partly in side elevation and in part in longitudinal section.

Fig. 2 is a view partly in end elevation and partly in transverse section taken on line 2—2, Fig. 1.

Fig. 3 is a detail sectional view taken on line 3—3, Fig. 1.

Fig. 4 is a perspective view of one of the hub teeth.

Fig. 5 is a detail sectional view of the coupling showing a modified form of packing means employed therein.

Fig. 6 is a view partly in side elevation and in part in longitudinal section showing a modified form of coupling construction.

Fig. 7 is a detail sectional view of the coupling of Fig. 6 showing a modified form of packing means employed therein.

Fig. 8$^A$ is an elevational view partly in section of the coupling of Fig. 6 adapted for use with vertical shafts.

Fig. 8$^B$ is an elevational view similar to that of Fig. 8$^A$ showing the coupling of Fig. 1 adapted for use with vertical shafts.

Fig. 9 is an elevational view partly in section of the coupling elements adapted for use as a universal joint.

Fig. 10 is a view similar to that of Fig. 6 showing the coupling with the teeth of Fig. 1.

In the form of coupling shown in Fig. 1, the shaft ends 1—2 have each rigidly secured thereto the hubs 3 and 4, the inner ends of which are shown flush with the shaft ends and spaced apart to form a gap 5. Integral with the outer ends of each of said hubs is a flanged cap 6, the flanges 7 thereof extending toward each other in overlapping relation with the ends of a sleeve 8 which is telescoped over said hubs prior to the assembly of said coupling in the manner well known. The sleeve 8 is of cylindrical formation and preferably of one piece the outer exposed surface thereof being accurately machined along with the outer surfaces 7$^a$ and opposite edges 7$^b$ to form accurate measuring surfaces for the determination of shaft misalignment and gap in the manner specifically set forth in my Patent No. 1,891,285.

Formed integral with each of the hubs 3 and 4 and spaced inwardly from the flanged caps 6 is a circumferential row of external teeth 9 which are adapted to mesh with a circumferential row of internal teeth 10 formed in the interior and at each end of the sleeve 8, the exact formation of said teeth to be more specifically described hereinafter.

The ends of the sleeve 8 terminate short of the bottoms of the flanged caps 6 and formed integral with said sleeve and spaced inwardly of said ends are collars 12 adapted to normally lie flush with the edges 7$^b$ of the flanges 7. Mounted on each end of the sleeve 8 for positive engagement with the interior of the flanges 7 is an oil seal or flexible packing 13, which comprises a cup leather or any other suitable flexible packing element 14 one side of which is clamped to the collar 12 and the other side engages the interior surface of the flange 7. Maintaining the packing element 14 clamped in position is an annular channel 15 telescoped over the end of the sleeve 8 which channel is in turn securely locked by the ring 16 and screws 17. Seated within the channel 15 is a coiled spring ring 18 of the radially expansible type which spring is adapted to resiliently press the unclamped portion of the flexible packing element 14 against the flange 7 to maintain a fluid tight seal at this point. It is deemed preferable to so position the packing 13 that the action of the line of pressure of the coiled spring ring 18 on the packing element 14 will coincide with the vertical medial plane passing through the teeth as indicated by the center line C.

A plug 20 is provided in one of the flanged caps 6 to permit the interior of the coupling to be completely filled with oil. To facilitate the passage of oil from one side of the teeth to the other parts 21 are formed in the hubs 3—4, inwardly of the walls between the roots of the hub teeth as shown in Figs. 1 and 2. It is evident that upon rotation of the coupling the centrifugal force set up in the body of oil within the same will react against the cup leathers 14 to more tightly press the same against the flanges 7, thus insuring the maintenance of a permanent and highly efficient oil seal. If desired the interior wall of the sleeve 8 may be inclined upwardly from the teeth 10 to the transverse medial portion of the sleeve whereby when the coupling is stationary and in case the coupling is not completely filled with oil, the oil will flow downwardly on each side of the sleeve to collect at the teeth in the manner readily apparent. This inclined wall or ridge will also function to throw the oil towards the teeth when the coupling is rotating, thus insuring complete lubrication of said teeth.

In the construction shown in Fig. 5, the hub 3ᵃ is mounted on the end of the shaft 1ᵃ and supports the sleeve 8ᵃ in exactly the same manner as the coupling construction shown in Fig. 1. The hub 3ᵃ is provided with a flanged cap 6ᵃ, the flange 7ᶜ of which overlaps the end of the sleeve 8ᵃ. Formed in the flange 7ᶜ and in the same plane with the hub teeth 9ᵃ is a peripheral groove 24. A threaded opening 25 extends from the groove 24 to the outside of the flange 7ᶜ which opening 25 is adapted to receive the plug 26. Fitted within the groove 24 is an annular channel shaped cup leather or other form of flexible packing member 27 which is adapted to snugly engage the surface of the sleeve 8ᵃ. The flexible packing 27 and the walls of the groove 24 define an annular chamber the interior of which is filled with a mobile substance such as grease inserted under considerable pressure into said annular chamber through the grease fitting 28, thus tightly forcing the packing element 27 against the sleeve 8ᵃ to form a fluid tight oil seal. In the event of a possible diminution of the pressure of the grease due to the possible leakage of the same, said pressure may be restored or even increased by turning the plug 26 inwardly into the groove or annular chamber to additionally compress the grease. While only one such plug has been shown it is to be understood that a plurality of the same may be utilized if so desired. This type of packing functions similarly to the packing 13 in the coupling shown in Fig. 1, and is able to accommodate itself to any angular misalignment and to maintain the established oil seal.

To permit the cooperating coupling elements comprising the hubs 3—4 and sleeve 8 to assume a varying angular relationship one with respect to the other it is necessary to provide the teeth on one of the elements with curved surfaces which are adapted to have rocking engagement with the surfaces of the cooperating teeth on the other element. With reference to the construction in this case the hub teeth are preferably formed with the curved surfaces which will be described in detail hereunder.

In the construction of the coupling shown in Fig. 1 the sleeve 8 is provided with teeth 10 which are of involute form with clearances left out, that is the side faces of the teeth 10 have the curve of an involute. The crowns of each of the teeth 10 and the walls between the roots of said teeth are substantially flat, thus each tooth 10 is of uniform cross-section from one end to the other. The teeth 9 of the hubs 3 and 4 are initially of the same form as the teeth 10 of the sleeve 8 as described above, and are cut into the desired form by providing the side faces of each tooth with a similar convex curvature such as 30 and 31, see Fig. 4. The crowns 32 of each tooth 9 and the walls 33 between the roots 34 of adjacent teeth 9—9 are similarly formed with a convex curvature in concentric relation to each other, the curve of the crowns and the curve of the walls having each a radius of curvature from the center of the hub indicated in Fig. 1 by the lines $R^w$ and $R^c$. The method in which the convex curvature is produced on the crowns, side faces and walls of the hub teeth is fully described in my co-pending application Serial Number 651,394, filed January 12, 1933.

With the hub teeth 9 formed as above described and when placed in cooperative relationship with the sleeve teeth 10 it becomes apparent that the hub teeth will have a bearing and rocking engagement with the sleeve teeth at all points, there being an unbroken or continuous line contact between said teeth around the entire peripheral circuit of said teeth at the medial transverse plane intersecting said teeth, said line contact being indicated in Fig. 2 by the line 35. It thus becomes evident, that by this tooth construction, the sleeve 8 is rockably supported at all points by the hubs 3—4 irrespective of the angular relationship between said hubs and teeth and permitting a greater degree of misalignment between the shafts 1 and 2 angular as well as parallel than hitherto permitted in rotary shaft couplings. Furthermore due to this continuous line contact the bearing contact for the transmission of torque is materially increased with a consequent increase in the overall efficiency of the coupling.

While the tooth profile in the above described construction is of involute form the same tooth characteristics may be utilized with a tooth profile of semi-circular, cycloidal, parabolic, sine or any desired calculated form of curvature adapted for a tooth profile. In any case the above described convex curvature may be readily utilized, either on the hub teeth or on the sleeve teeth or on both. It must be stressed at this point that the tooth form of the hub teeth in cooperation with the tooth form of the sleeve teeth to produce the continuous line contact as above described is applicable only to shaft couplings, because each hub tooth cooperates at all times only with each of the adjacent sleeve teeth and vice versa as clearly shown in Figs. 2 and 3. This tooth relationship is hence not contemplated for use in gear teeth, the function of which renders the use of teeth as above constructed impossible.

If desired for special applications as in the case of magnetos, etc., the number of teeth at one end of the coupling, that is the teeth on one hub and the cooperating teeth on the sleeve adjacent to said hub may differ from the number of teeth on the other hub and the cooperating teeth on the other end of said sleeve, at the other end of said coupling.

In some cases it may be found desirable to have the walls between the roots of the hub teeth straight and not convexly curved as in the tooth construction 9 of the hubs shown in Fig. 1. Fig. 5 illustrates such a contemplated tooth construction wherein the side walls and crown of each tooth 9ª are identical in every respect with the convexly curved side walls and crown of the teeth 9, but the walls 9b are straight as clearly shown. With such a tooth form as 9ª there will not be a continuous bearing and rocking engagement around the peripheral circuit of the teeth when the teeth 9ª are meshed with the teeth 10ª of the sleeve 8ª. In this case bearing and rocking engagement will be only on the crown and side faces of the hub teeth 9ª on the teeth 10ª, the sleeve 8ª being supported only on the crowns of the teeth 9ª.

Another modified form of tooth construction is shown in the hub teeth of the couplings shown in Figs. 6 and 7 and will be described in detail hereinafter.

In the coupling shown in Fig. 6 the hubs 40 and 41 are mounted respectively on the ends of the shafts 42 and 43, the intermediate portions of said hubs having each formed thereon a row of teeth 44. Surrounding the hubs 40 and 41 is a two piece sleeve 45 comprising the sleeve parts 46 and 47. Each of the sleeve parts 46 and 47 is provided with a row of teeth 48 of the same form as the teeth 10 of the coupling shown in Fig. 1 to cooperate with the teeth 44 on the hubs 40—41. The sleeve parts 46—47 are securely held together in assembled relation by the bolts 50. Mounted on the outer ends of each of the hubs 40—41 is a packing 51 which comprises a cup leather or flexible packing element 52 clamped to the hub by ring 53 in any desired manner. A surface of the packing element 52 engages an outer flanged end portion of the sleeve 46—47 and is resiliently forced against said flanged end by a radially expanding coiled spring ring 54 positioned within the packing 51 as clearly shown. The function of this packing 51 at each end of the coupling is identical in all respects with the function of the packing 13 (Fig. 1) as previously described. The interior of the coupling shown in Fig. 6 is completely filled with a lubricating oil which during the rotation of the coupling acts not only to lubricate the teeth but also due to the centrifugal force set up in the body of oil exerts an additional force against the packing element 52 to more tightly press the same against the sleeve flanges thus positively insuring the maintenance of the established oil seal. The function and operation of this coupling is similar in all respects with the coupling shown in Fig. 1.

The teeth 44 on the hubs 40—41 of the coupling 45, Fig. 6 differ from the form of hub teeth shown in Figs. 1 and 5. The teeth 44 are each provided with a convexly curved crown, the walls between the teeth being similarly convexly curved and in concentric relation with said curved crowns. The side faces of each of the teeth 44 are straight and have the same form as the side faces of the cooperating sleeve teeth 48. Accordingly in this coupling there is rocking engagement only on the crowns and walls.

In Fig. 7 there is shown a pressure grease packing 55 which may be used with the coupling shown in Fig. 6. This packing however, is carried in a peripheral groove 56 formed in the edge of the flange 57 of the sleeve part 46ª and comprises an annular cup leather or flexible packing element 58 of channel shape, the legs of which fit within the groove 56. A radially contracting coiled spring ring 59 is positioned within the packing element 58 to hold the same snugly on the hub 40ª. The annular space defined by the packing element 58 and the groove 56 is completely filled with grease under pressure which is inserted into said space through the grease nipple 60. To compensate for loss of pressure in the grease a threaded opening 61 is provided in the flange 57, in which is threaded the plug 62. Movement of the plug inwardly into the body of the grease will compact the same and increase the pressure therein and subsequently the pressure of the packing element 58 on the hub 40ª.

The type of hub tooth 63 shown by way of example on the hub 40ª in Fig. 7 is identical with the hub teeth shown in Fig. 5 of my prior patent, and consists of straight side faces, straight crowns and convexly curved walls between the roots. In this case there is rocking engagement only between the walls of the hub teeth 63 and the crowns of the sleeve teeth 63ª.

While a specific type of tooth has been shown on each of the different forms of couplings it is to be understood that any form of hub tooth as above described may be employed with any type of coupling.

Fig. 8ᴬ shows the manner in which a coupling such as shown in Fig. 6 may be used for connecting the ends of vertically arranged shafts. The sleeve 64 comprising the sleeve parts 65 and 66 are each provided at their inner ends with integral flanges 65ª—66ª adapted to be securely clamped together by bolts (not shown) such as 50. Fig. 6. Securely clamped between the flanges 65ª—66ª is a plate 67 formed with a central opening 68. Pressed or otherwise secured within said opening is a ball race or carrier 69 adapted to have seated therein in anti-friction bearing engagement a steel ball 70. Placed within the end of the lower vertical shaft 71 is a hardened metal wear plate 72 upon which the ball 70 is rotatively mounted. With the coupling assembled to the ends of the vertical shafts 71 and 71ª, the weight of the sleeve 64 is entirely supported by the ball 70 on the end of the shaft 71. The hubs 73 and 74 are thus relieved of any strains incident to supporting the sleeve 64 and function in cooperation with the sleeve for the sole transmission of torque from one vertical shaft to the other. If desired the single ball bearing 70 may be replaced by a self-aligning anti-friction bearing unit to be mounted between the end of one of the vertical shafts 71—71ª and the plate 67, which unit will not only act to support the sleeve but will also permit angular movement of the same depending upon whether the vertical shafts are misaligned or not.

While the showing in Fig. 8ᴬ for the vertical mounting of a coupling shows portions of the type of coupling illustrated in Fig. 6, it is to be understood that the coupling shown in Fig. 1 may also be utilized for connecting the ends of vertical shafts. With such a coupling Fig. 8B the one piece sleeve 8 is provided with a transverse wall 67a similar to the plate 67 which wall may either be integral with the intermediate portion of the sleeve 8 or rigidly secured thereto in any desired manner; said wall having mounted therein the anti-friction bearing 69, 70 for supporting the sleeve on the end of the shaft.

Referring back to the form of tooth structure employed in the coupling of Fig. 1 as above disclosed it has been found that the variation in angular misalignment permitted between two shaft cooperating members, one having curved teeth such as 9 on the hub 3, Fig. 1, and the other straight teeth such as 10 on the sleeve 8, Fig. 1, may reach as much as 6 degrees, in all angular directions of one shaft with respect to the other. Such a condition exists when the shaft ends are relatively far apart and misaligned. In this case it has hitherto been customary to place an auxiliary shaft between said shaft ends and to connect each end of the auxiliary shaft to the respective ends of the main shafts by couplings. Thus for a condition as this it is necessary to utilize two couplings and when so employed the degree of misalignment between the shaft ends may well reach as much as 6 degrees as above set forth. The coupling shown in Fig. 1 may be used to connect two shaft ends which are misaligned and spaced a considerable distance apart by merely increasing the length of the sleeve 8, the coupling being connected to the shaft ends in exactly the same manner as illustrated in Fig. 1. It has also been found by virtue of this fact that such a construction may be readily utilized as a universal joint, a form of such joint being shown in Fig. 9.

In Fig. 9 the shafts 80 and 81 are connected by the universal joint or connection indicated generally by 82. The universal joint 82 comprises a hub member 83 and a surrounding sleeve member 84 each rigidly secured, respectively, to the ends of the shafts 80 and 81 in any desired manner. The hub member 83 at its inner end is provided with an external row of curved teeth 85, it being sometimes necessary to form a relatively few number of teeth 85 and the cooperating teeth 87 whereby greater angularity can be obtained between the shafts 80 and 81, the teeth 85 are similar in form to the teeth 9 on the hub 3, Fig. 1. The sleeve 84 has an integral flange 86 which on the interior thereof is provided a row of teeth 87 similar to the teeth 10 on the sleeve 8, Fig. 1. To hold the hub 83 and sleeve 84 in assembled relation there is provided a ring cap 88, surrounding the hub 83 and secured to the sleeve 84 in any suitable manner. Carried by the hub 83 is a packing 89 which comprises the flexible packing element 90 fitted over a spring ring 91 of angle form in section. The flexible packing element 90 and spring 91 are clamped to a shoulder 92 formed on the hub 83 by a clamp ring 93 which is fixed to said hub in any suitable manner. The free portion of the flexible packing element 90 engages the inner end of the cap ring 88 and is resiliently pressed against the same by the spring action of the free leg of the spring ring 91. The packing 89 forms a positive seal for the lubricating oil which fills the interior of the universal connection 82, said oil being inserted thereinto through the opening in the wall thereof normally closed by the plug 94. While the shafts 80 and 81 are shown in alignment with each other, yet due to the degree of rocking permitted between the hub and sleeve in all angular directions, rotation of one shaft will be transmitted to the other shaft during any angular movement one shaft may make with respect to the other. Such a condition of shaft movement exists in the drive of an automobile wherein the propellor or drive shaft transmits the power from the transmission to the differential, there being a universal connection at each end of the drive shaft, to accommodate the angular movement of the same which sometimes is as much as 12 degrees. A universal connection such as 82 may readily be used at each end of the drive shaft of an automobile. Due to the 6 degree angular misalignment permitted in the joint or connection 82 as described above, a connection 82 at each end of a drive shaft will accordingly permit the 12 degree angular movement of the same. The universal connection 82 possesses the same advantages derived in the shaft couplings as above described. Due to the oil tight packing and the complete filling of the universal connection with oil the same will require little attention, if any. The universal connection 82 may be adapted for use wherever a joint of this type is desired, its adaptation to an automobile drive as above described being merely given as one example.

Fig. 10 illustrates a coupling having the same structural characteristics as that of Fig. 6, but instead of employing the teeth 44—48, said coupling utilizes the teeth 9 and 10 shown in Fig. 1.

Various forms of the invention have been shown and described for illustrative purposes, but it is to be understood that the invention is not to be limited to the exact structures shown, for changes may be made therein without departing from the spirit of my invention.

What I claim is:—

1. A rotary shaft coupling comprising spaced hub members and a sleeve member surrounding the same, teeth on said members cooperating with each other for the transmission of torque, the teeth on one of said members being each formed with curved side faces and a curved crown, the walls between the roots of said teeth being also curved.

2. A rotary shaft coupling comprising a pair of hub members and a sleeve member surrounding the same, teeth on said members cooperating with each other for the transmission of torque, the teeth on said hub members being each formed with curved side faces and a curved crown, the walls between the roots of said teeth being also curved.

3. A rotary shaft coupling comprising a pair of hub members and a sleeve member surrounding the same, teeth on said hub members and sleeve member cooperating with each other for the transmission of torque, the teeth on said hub members being each formed with curved side faces and a curved crown, the walls between the roots of said teeth being also curved, said hub teeth having rocking engagement on all surfaces with the cooperating teeth of said sleeve member.

4. A rotary shaft coupling comprising longitudinally slidable hub members and a sleeve member bridging the same, teeth on said members cooperating with each other for the transmission of torque, the teeth on one of said members being each formed with a curved crown and curved walls between the roots of said teeth for rocking and bearing engagement respectively with the walls between the roots of the teeth and the crowns of the teeth on the other of said members.

5. A rotary shaft coupling comprising a hub member and a sleeve member, teeth on said members cooperating with each other for the transmission of torque, the teeth on one of said members being each formed with curved side faces and a curved crown, the walls between the roots of said teeth being also curved, said curved teeth having rocking engagement on all surfaces thereof with the cooperating teeth of the other of said members.

6. A rotary shaft coupling comprising a sleeve member and a hub member longitudinally slidable within said sleeve member, projections on said members intermeshing with each other for torque transmission, the projections on said members having doubly curved surfaces forming substantially complete peripheral line contact while allowing angularity between members.

7. A shaft coupling with a hub member and a sleeve member arranged in telescoping relationship, a circumferential row of teeth on each of said members cooperating for torque transmission, the surfaces on and between the teeth of the members being curved and intermeshing to form substantially peripheral line contact in any angular relationship of the shafts.

8. In a rotary shaft coupling, a hub member having at one end thereof a flanged cap defining with said hub an annular recess, a circumferential row of teeth on said hub member positioned in said recess, a sleeve member telescoped within said recess, a circumferential row of teeth interiorly of said sleeve member cooperating with said hub teeth, and a radial flange on said sleeve member substantially closing said recess.

9. The structure as specified in claim 8, said radial flange in cooperation with said sleeve member and flanged cap forming an annular packing chamber, and packing within said chamber.

10. The structure as specified in claim 8, said cooperating rows of teeth being formed with surfaces so constructed and arranged as to establish at all times a continuous line contact along the entire peripheral circuit of said teeth, irrespective of the angular relationship between said hub and sleeve members.

11. In a rotary shaft coupling, a hub member and a sleeve member arranged in telescoping relationship, a circumferential row of teeth on each of said members cooperating for torque transmission, said teeth being formed with doubly curved surfaces so arranged as to establish at all times a continuous line contact along the entire peripheral circuit of said teeth.

12. In a rotary shaft coupling, telescoping hub and sleeve members, cooperating teeth on said members formed with doubly curved surfaces so arranged as to establish at all times a continuous line contact along the entire peripheral circuit of said teeth, a ring cap on said sleeve member limiting relative outward movement of said members, a shoulder on said hub member, and packing means secured to said shoulder and engaging said ring cap for effecting a lubricant seal between said members.

13. The structure as specified in claim 12, said cooperating teeth dividing the interior of said coupling into two separate and distinct lubricant reservoirs, and a plurality of lubricant conducting means associated with one of said members for communicating both of said reservoirs.

14. A rotary shaft coupling comprising a sleeve member and a hub member longitudinally movable within said sleeve member, teeth on said members cooperating with each other for torque transmission, the teeth on one of said members being each formed with curved side faces and a curved crown, the walls between the roots of said teeth being also curved, said teeth forming substantially a continuous peripheral line contact, irrespective of the angular relationship between said members.

15. A rotary shaft coupling comprising a hub member and a sleeve member, teeth on said members cooperating with each other for the transmission of torque, the teeth on one of said members being each formed with curved side faces and a curved crown, the walls between the roots of said teeth being also curved, the teeth on the other of said members being each formed with side faces which are of involute form with clearances left out, the crowns and walls between the roots of said last mentioned teeth being substantially flat surfaces, said teeth in their cooperative surface engagement establishing a line contact that extends unbroken along the entire peripheral circuit of said teeth which is maintained at all times irrespective of the angular relationship between said members.

16. A shaft coupling comprising a pair of hub members each adapted to be secured to the end of a substantially vertical shaft, a sleeve surrounding said hub members, teeth on each of said members cooperating to transmit torque from one shaft to the other, supporting means in the interior of said sleeve, bearing means between said supporting means and the end of one of said substantially vertical shafts whereby the entire weight of said sleeve is carried by said shaft end.

17. A coupling for connecting the spaced ends of a pair of vertically arranged shafts comprising a hub mounted on each shaft, a sleeve surrounding said hubs, teeth on said hubs and sleeve cooperating to transmit torque from one shaft to the other, supporting means in the interior of said sleeve and positioned between said shaft ends, bearing means between said supporting means and the end of one of said shafts whereby the entire weight of said sleeve is carried by said shaft end.

18. A coupling for connecting the spaced ends of a pair of vertically arranged shafts comprising a hub mounted on each shaft, a sleeve surrounding said hubs, teeth on said hubs and sleeve cooperating to transmit torque from one shaft to the other and adapted to have rocking engagement, supporting means in the interior of said sleeve and rigid therewith, bearing means between said supporting means and the end of one of said shafts whereby the entire weight of said sleeve is carried by said shaft end.

19. In a vertical shaft coupling, a hub member secured to the end of each shaft, said hub members being each provided with a cap flange extending towards each other, a sleeve member connecting said hub members and telescoped within said cap flanges, a row of teeth on each of said hub members cooperating with like rows of teeth on said sleeve member, said rows of teeth being formed with surfaces so constructed and arranged as to establish at all times a continuous line contact along the entire peripheral circuit of said teeth, and means carried by said sleeve member and adapted to have bearing engagement with the end of the lower shaft for supporting the entire weight of said sleeve.

JULIAN S. LOEWUS.